United States Patent [19]

Berggren et al.

[11] 3,930,426
[45] Jan. 6, 1976

[54] METHOD OF MAKING A SAW BLADE
[75] Inventors: Bo Erik Gunnar Berggren; Nils Torsten Strandberg, both of Soderfors, Sweden
[73] Assignee: Stora Kopparbergs Bergslags Aktiebolag, Falun, Sweden
[22] Filed: Mar. 5, 1975
[21] Appl. No.: 555,561

Related U.S. Application Data
[62] Division of Ser. No. 351,820, April 17, 1973, abandoned.

[30] Foreign Application Priority Data
Apr. 20, 1972 Sweden .......................... 5152/72
Sept. 26, 1972 Sweden .......................... 12394/72

[52] U.S. Cl. ............................................. 76/112
[51] Int. Cl.² .......................................... B23D 63/00
[58] Field of Search ............ 29/95 R, 95 B; 76/112; 83/835

[56] References Cited
UNITED STATES PATENTS

| | | | |
|---|---|---|---|
| 2,683,923 | 7/1954 | Replogle | 76/112 X |
| 3,593,600 | 7/1971 | Adams et al. | 76/112 |
| 3,674,083 | 7/1972 | Stier et al. | 76/112 X |
| 3,766,808 | 10/1973 | Cremisio et al. | 76/112 |
| 3,800,633 | 4/1974 | Funakubo | 76/112 |

Primary Examiner—Al Lawrence Smith
Assistant Examiner—James G. Smith
Attorney, Agent, or Firm—Curtis, Morris & Safford

[57] ABSTRACT

In the manufacture of saw blades a metal block is first produced, having a central portion consisting of cutting tool steel. The block is now flattened to form a sheet in which the cutting tool steel forms a central strip. The sheet is now divided to form two blades, each blade having an edge portion consisting of the cutting tool steel. Saw teeth are finally cut in said edge portion.

11 Claims, 5 Drawing Figures

METHOD OF MAKING A SAW BLADE

This is a division, of application Ser. No. 351,820, filed Apr. 17, 1973 now abandoned.

This invention relates broadly to the art of making saw blades, e.g. hack saw blades or band saw blades, particularly of the type employed in cutting metals, and has as its purpose to provide an improved saw blade stock and, more specifically, to provide a better and more practical way of making good saw blades.

Manufactures of saw blades have long known and appreciated that the ideal saw blade is the one in which the teeth are formed of cutting tool steel, and the back portion of the blade is made of a tough carbon or low alloy steel so as to be capable of withstanding shock and have high resistance to fatigue failure.

The term "cutting tool steel" as used herein covers any of the steel alloys normally used for cutting tools. Thus it includes high carbon steel, high carbon steel alloys, high speed steel, and semi high speed steel, the selection depends simply upon the intended use of the saw blade to be made from the band saw blade stock.

Such blades have been produced by welding a thin strip of cutting tool steel to one edge of a flexible alloy steel band. This method has not proved to be reliable because it results in a non-uniform product. Thus the welding of the cutting tool steel directly to the carbon or low alloy tough steel results in a welding joint containing hard brittle portions due to a partial melting of the steel during the welding. These hard brittle portions are often starting points for fatigue cracks. It has been found that this method requires the use of electron beam welding in vacuum or in at very low pressure. Even if the blade produced in this way is heat treated, much of the weld structure will be maintained, thereby causing premature failure of the saw.

It has also been proposed to make composite saw blade stock by pouring a melt with a composition corresponding to one portion of the saw blade on a billet with a composition corresponding to the other portion of the blade. This bimetal billet is then rolled to a band which is heat treated and in which teeth are cut in one edge. This method has been without success because of the difficulties of obtaining a good structure and an even joint between the strips.

In accordance with the method of the present invention, there is provided a saw blade stock comprising a composite band consisting of 1. a flexible back strip of steel possessing the properties necessary to withstand shock and have good resistance to fatigue failure, and
2. a tooth strip of cutting tool steel, said strips being of indiscriminate length, uniform width and thickness and being permanently bonded together along one edge with a straight thin intermetallic joint extending across said edge and having an exceptionally fine grained structure obtained as a result of dimensional reduction by heat working.

The first of said strips forms the back of the saw blade. In the second strip the teeth may be formed by conventional means as cutting and grinding. When making a band saw blade, the gullets between the teeth are extended through the joint between the strips, so that the body of the saw is formed only by the tough back strip. When making hack saw blades, the bottom of the gullets will end in the harder second strip. The body of the saw therefore comprises both the tough back strip and part of the cutting tool steel.

The saw blades made in this way are capable of being hardened by conventional means as by heating, quenching and tempering to full hardness of the teeth and toughness of the back without warping or distortion.

Examples of the composition of the tooth strip are given in Table I and of the back strip in Table II Table I

| AISI Designation | C % | Mn % | Si % | Cr % | V % | W % | Mo % |
| --- | --- | --- | --- | --- | --- | --- | --- |
| M2 | .84 | .3 | .3 | 4.2 | 1.9 | 6.32 | 5.0 |
| M3:2 | 1.20 | .3 | .2 | 4.2 | 3.3 | 6.4 | 5.0 |

Table II

| AISI Designation | C % | Mn % | Si % | Cr % | V % | Mo % |
| --- | --- | --- | --- | --- | --- | --- |
| H 13 | .4 | .4 | 1.1 | 5.24 | .99 | 1.345 |
|  | .65 | .6 | 1.6 | .30 | .18 | .47 |
|  | .52 | .95 | .25 | 1.1 | .1 |  |

The method of this invention comprises:

1. Two plane parallel plates or pieces composed of the steel intended for the back strip are placed vertically in the same plane with a narrow space between two parallel vertical edges. The space between the plates is closed at the bottom and at the sides, e.g. by plates of plain carbon steel or by water cooled jackets. The upper end of the space is left open.

2. A melt of cutting tool steel intended for the tooth strip is formed in the space between the plates by electric melting of alloy steel fed into the space and at the same time melting a controlled part of the plane parallel plates forming opposite walls of the space. The alloy steel is fed into the space as wires or rods functioning as electrodes. These are melted to drops which join the melt. It is essential that the melt is formed of the cutting tool steel which is more highly alloyed than the steel of the plates intended for the back strip, as only this will give the desired thin and straight joint between the materials. The electrode tips, the melt drops and the melt are shielded from the atmosphere.

3. The melt is successively, as it is formed, solidified to casting, which unifies the two plates and thereby forms a billet composed of three parallel parts.

4. The billet is hot and cold worked, for example, by forging and rolling in a direction parallel to the joints between the three parts to a metal band with a thickness corresponding to the thickness of the intended saw blade but at least double its width and composed of three aligned strips joined at their edges with the cutting tool steel forming the central part.

5. The metal band is thereafter divided into two bands by slotting along the centre of the cutting tool steel part.

Figure 1:
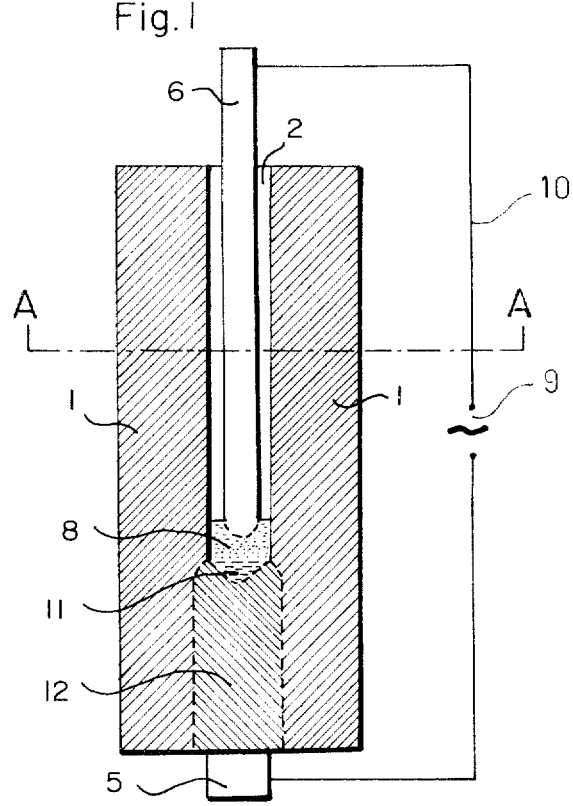
FIG. 1 is a cross sectional view taken through FIG. 2.
Figure 2:
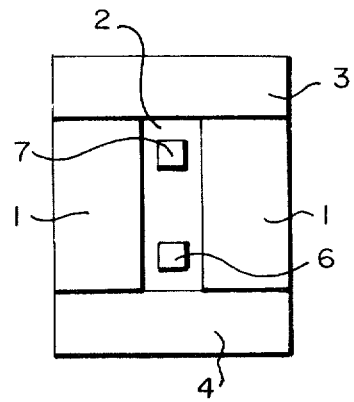
FIG. 2 is a top view of an arrangement for producing billets in accordance with this invention.

FIGS. 1 and 2 show how two plates 1 of a tough steel intended for the back part of the saw blade are placed in parallel vertical position. The space 2 between these plates has been closed at the ends by carbon steel plates 3 and 4 and underneath by a plug 5. Instead of the plates 3 and 4 water cooled jackets of e.g. copper may be used. These walls will in this case not be welded to the produced billet, and need not be scarfed away before using the billet. Two electrodes 6 and 7 of a composition calculated to give the cutting tool steel intended for the tooth part of the saw blade are introduced into the space between the plates. The tips of the electrodes are covered by a melted slag 8 which shields them and the molten metal 11 from the air. Instead of molten slag even an inert gas, for example carbon dioxide or nitrogen can be used as shielding medium. Even in this case a small amount of refining slag may be added. The electrode 6 is connected to a suitable power supply 9 with lines 10. Through the current, which passes the slag or forms an arc when gas is used as shielding medium and thereby heats the electrodes, drops of molten metal are formed and join the molten bath 11 which successively is solidified to an ingot 12, which fills the space between the plates 1. A part of the plates are also melted and mixed into the molten bath, which give a good connection between the ingot and the plates. The amount of the plates which is melted down can be regulated by the cooling of the plates and by the current through the electrodes. Instead of two electrodes 6 and 7, one electrode which oscillates in horizontal direction in the space can be used. In this way it is possible to get a straight joint between the ingot and the material in the plates.

Figure 3:
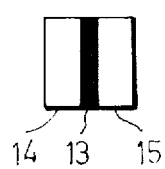
FIG. 3 is a side view of a billet produced in accordance with the method of the invention.

FIG. 3 shows on a reduced scale a cross sectional view through a billet produced in the arrangement shown in FIGS. 1 and 2. It comprises a central part 13 of cutting tool steel bonded to two outer 14, 15 parts of steel intended for the back strip of a saw blade.

Figure 4:
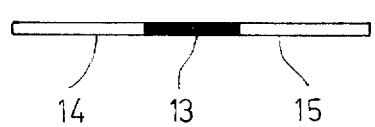
FIG. 4 is a side view of the band produced by hot and cold working of the billet according to FIG. 3.

FIG. 4 shows a cross sectional view of a band produced by hot and cold working of the billet of FIG. 3. The central strip 13 is composed of cutting tool steel. By dividing the central strip, two bands of saw blade stock are produced.

Figure 5:
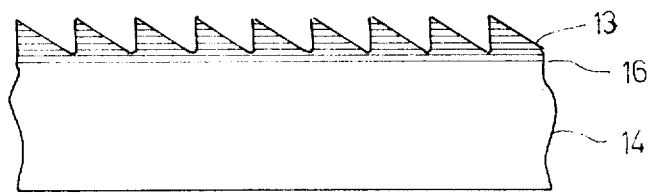
FIG. 5 is a side view of a short length of a saw made from the stock of the invention.

FIG. 5 shows how the saw blade stock according to the invention is used to make saw blades. The teeth are cut in the cutting tool steel strip 13. In this case the gullets do not reach the joint 16 between the strips, and the body contains both the back strip and a part of the cutting tool steel strip.

As a specific example of the practice of the invention, two bars, 100 mm square and with a length of 1 meter and composed of the steel H 13 according to Table II, were placed in vertical direction with two sides parallel at a spacing of 30 mm. At the bottom the space was closed by an ordinary steel plate. With an ordinary electro slag welding equipment, two wires of a steel with the composition C .97, Si .20, Mn .27, Cr 3.93, Mo 6.1, W 8.21, and V 2.14 were melted down between the bath. The ends of the space were closed by water-cooled copper walls. The current of the electrodes and cooling of the equipment were controlled in such a way that casting included about 30 % from the bar material and the resulting composition of the middle section of the produced billet had a composition corresponding to M2 in Table I.

The billet was hot rolled in a direction perpendicular to its smallest thickness. In this way a band 3 mm thick and 100 mm wide was produced with a centre part 20 mm wide, composed of high speed tool steel. After annealing the band was cold rolled to a thickness of 2 mm. After another annealing the band was divided into two bands of saw blade stock which, after trimming, had a width of 40 mm including a 9 mm cutting tool steel strip.

When using this band for hack saw manufacture, the blades were punched from the band, the teeth were milled by a cutter. The blade was heated to 1220°C and quenched in a salt bath and tempered. The achieved hardness of the teeth was 65 Rockwell C and the hardness of the backstrip was 55 Rockwell C.

What is claimed is:

1. A method of making a saw blade consisting essentially of a steel tooth strip joined to a steel back strip, the quality of the steel of the tooth strip being different from that of the back strip, comprising maintaining two plates of back strip steel in spaced parallel relation to one another, supplying molten tooth strip steel to the space between said plates for solidification thereof to form a billet consisting of three parallel layers, working said billet to form a composite strip having the desired thickness of the saw blade, said composite strip consisting of two edge portions of back strip steel and a central portion of tooth strip steel, dividing said composite strip along the middle of the central portion, and cutting saw teeth in the tooth strip steel edge thus formed.

2. The method defined in claim 1 in which (1) the two parallel plates of the steel intended for the back strip are in the vertical position and the space between two parallel plates is closed at the bottom and at the ends; (2) the cutting tool steel intended for the tooth strip is formed as a melt in the space between the plates which, upon solidifying to a casting, unifies the plates and forms the billet; and (3) hot and cold working the billet in a direction parallel to the joints between the three parts to a band with the desired thickness and a width at least twice the width of the desired saw blade.

3. The method according to claim 2, characterized in that the melt in the space is formed by supplying drops of a molten steel with a composition, which after mixing with a controlled amount of the steel of the plane parallel plates melted by the heat introduced into the space, gives the intended cutting tool steel.

4. The method according to claim 3, characterized in that the amount of molten steel from the plane parallel plates mixed into the melt is 20–40%, preferably 30%, of the amount of steel introduced by the drops.

5. The method according to claim 2, characterized in that the drops of molten steel are formed by electric melting of electrodes, that are introduced into the space between the plane parallel plates.

6. The method according to claim 5, characterized in that the melt, the molten drops, and the tips of the electrodes are shielded against air.

7. The method according to claim 6, characterized in that admission of air is prevented by introducing an inert gas in the space.

8. The method according to claim 6, characterized in that a refining slag is added to the molten steel.

9. The method according to claim 5, characterized in that admission of air is prevented by a molten slag.

10. The method according to claim 2, characterized in that the space between the plane parallel plates is closed at the ends by water-cooled jackets, which are removed when the melt is solidified.

11. The method according to claim 2, characterized in that the space between the two plane parallel plates is closed at the bottom and the ends by metallic material which is bond to the melt when it solidifies and which is removed before the hot working of the billet.

* * * * *